Feb. 7, 1967             J. R. GATELY           3,303,411
REGULATED POWER SUPPLY WITH CONSTANT VOLTAGE/CURRENT
CROSS-OVER AND MODE INDICATOR
Filed April 30, 1963                                   4 Sheets-Sheet 1

INVENTOR.
JOSEPH R. GATELY
BY
*Alfred W. Barber*
ATTORNEY

INVENTOR.
JOSEPH R. GATELY
BY
Alfred W. Barber
ATTORNEY

INVENTOR.
JOSEPH R. GATELY
BY Alfred W. Barber
ATTORNEY

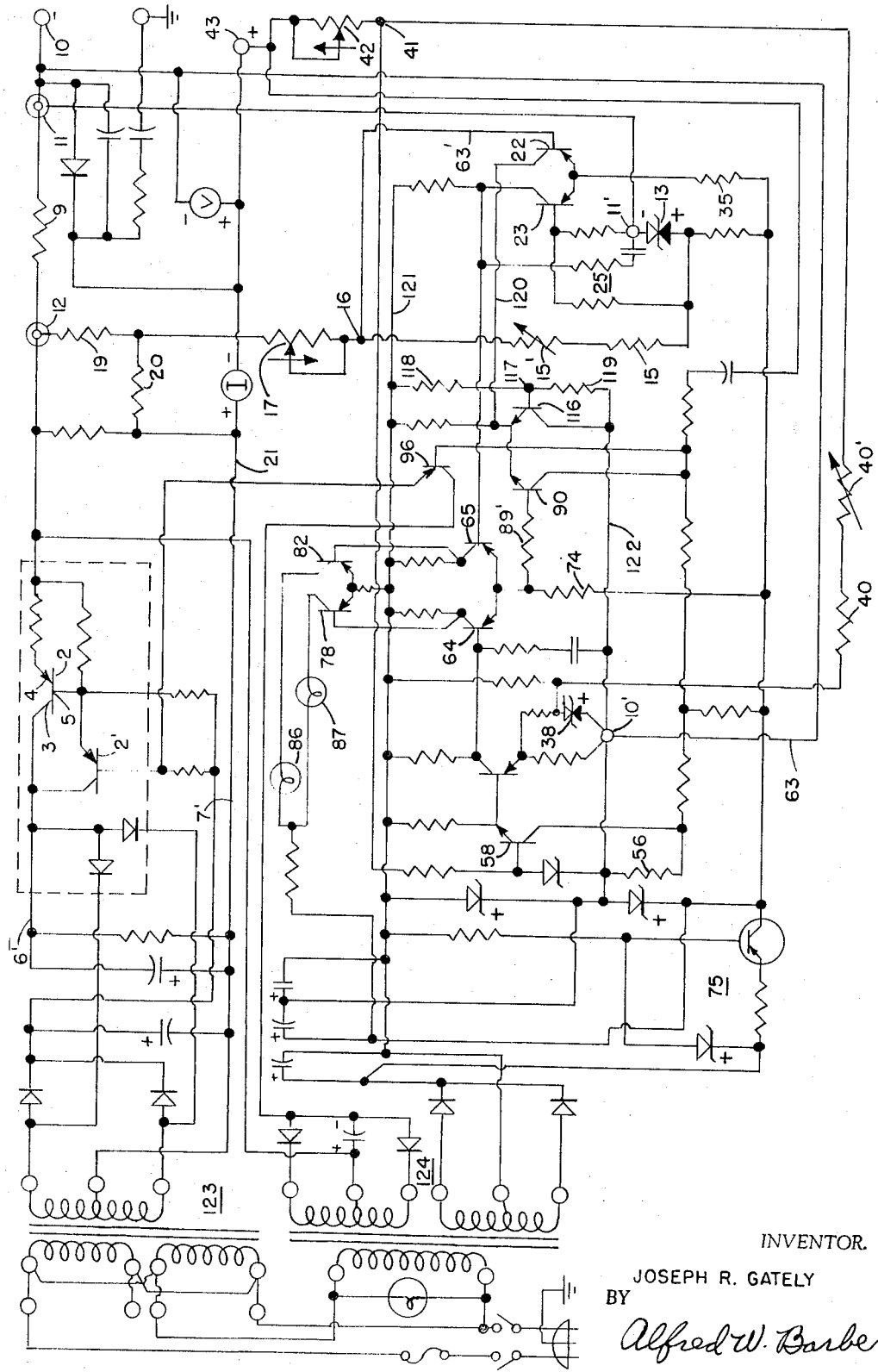

United States Patent Office 3,303,411
Patented Feb. 7, 1967

3,303,411
REGULATED POWER SUPPLY WITH CONSTANT VOLTAGE/CURRENT CROSS-OVER AND MODE INDICATOR
Joseph R. Gately, Woodside, N.Y., assignor to Forbro Design Corp., New York, N.Y., a corporation of New York
Filed Apr. 30, 1963, Ser. No. 276,954
4 Claims. (Cl. 323—4)

The present invention concerns regulated power supplies including both voltage and current regulation and indicating means for showing whether the regulation is operating in the current or the voltage mode.

A regulated power supply may be defined as a power supply incorporating some regulating means to compensate for line voltage changes or load impedance changes in order to provide more constant voltage or more constant current to the load than would be provided by a similar power supply without the regulating means. In order to instruct the regulating means, output voltage sensing and comparison means and output current sensing and comparison means are provided. When either the voltage or the current depart from the predetermined values set up by the sensing and comparison circuits, the regulating means is controlled in such a direction as to tend to restore them to the predetermined value.

A convenient circuit for sensing, comparison and control is shown and described in U.S. Letters Patent No. 3,028,538 where a bridge circuit is used for the sensing and comparison and a control or error amplifier driving a pass transistor is used for the regulating means. A second and similar bridge circuit may be used for current sensing, comparison and control as will be set forth in detail below.

Now for a given value of load resistance there is only one value of current which can exist at a given voltage or conversely only one value of voltage which can exist at a given current. These simultaneously existing values of voltage and current are called the voltage/current cross-over values since on either side of these values the system must operate either in the constant current mode or the constant voltage mode.

From an operational standpoint, it is desirable that the voltage/current cross-over point be a definite point and that the constant current and constant voltage lines be straight lines right up to the cross-over point. It has been found in accordance with the present invention that if the voltage and current control voltages are amplified and then applied to an exclusive OR circuit that a trigger action may be produced with substantially no hysteresis effect which passes to the regulating means a control which is either voltage mode or current mode and with substantially no intermediate or ambiguous condition around the cross over point. In addition the exclusive OR or trigger circuit may be utilized to actuate indicators such as lamps indicating which mode, voltage or current, is in control. Both the sharp unambiguous cross-over and the mode indicators have been found to be very useful and a significant step forward in the art of voltage/current regulated power supplies.

Accordingly, one object of the present invention is to provide a voltage/current regulated power supply with improved operating characteristics.

Another object is to provide a sharp and substantially unambiguous cross-over from voltage mode to current mode and vice versa in a voltage/current regulated power supply.

A further object is to provide mode indicators in a voltage/current regulated power supply.

A still further object is to provide substantially unambiguous mode indicators in a voltage/current regulated power supply.

These and other objects will be apparent from the detailed description of the invention given in connection with the various figures of the drawing.

In the drawing:

FIGURE 4 is a schematic circuit diagram of the form of the present invention shown in FIGS. 2 and 3 and with still further details added.

Figure 1:
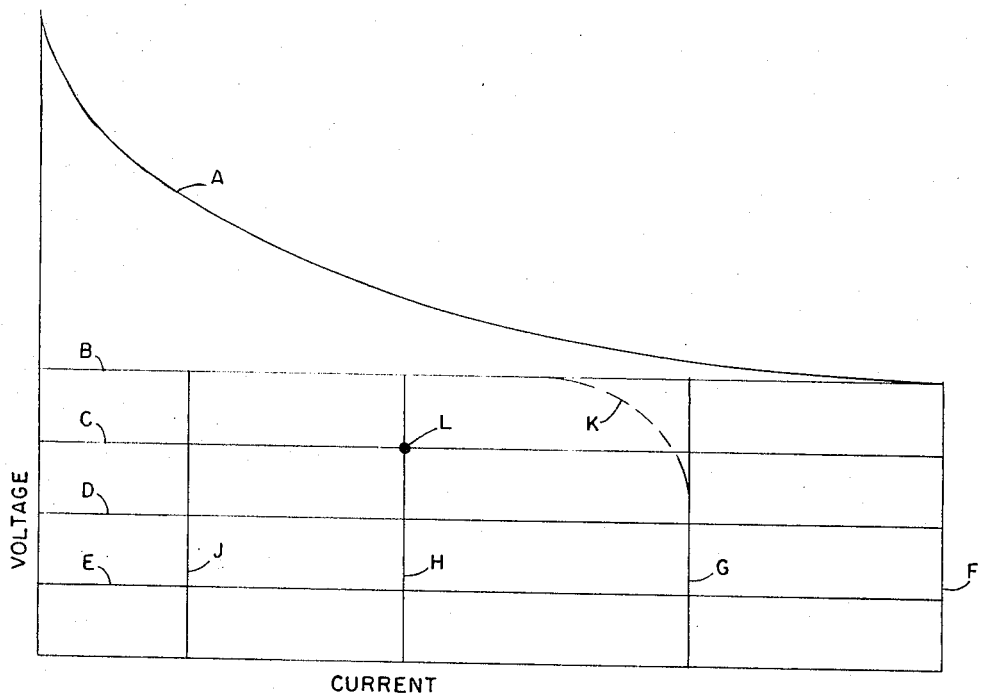
FIGURE 1 is a set of curves illustrating voltage/current regulated power supply operation.

FIG. 1 is a set of curves illustrating the operation of regulated power supplies in regulated voltage and regulated current modes and also voltage/current cross-over. Current is shown along the horizontal axis and voltage along the vertical. Curve A is a typical characteristic of an unregulated power supply showing how the voltage starts out very high at zero current and drops rapidly at first and then more slowly as the current is increased. For purposes of explanation, it is assumed that the current is varied by varying the load on the power supply.

Curves B, C, D and E of FIG. 1 illustrate the output of a voltage regulated power supply showing how the voltage is held constant at various levels as the current is varied as by changing the load resistance connected to the power supply. Similarly, curves F, G, H and J illustrate the output of a current regulated power supply showing how the output voltage varies as the load resistance is changed. Now, a power supply which has both voltage and current regulation will supply constant voltage as, for example, along line B until its current regulation line, for example, line G is approached when it will change over from one to the other as, for example, along curve K. In accordance with the present invention, however, the change from one mode to the other is practically instantaneous as for example at point L where the constant voltage mode along line C suddenly switches to the constant current mode along line H or vice versa. Similarly, changes from constant voltage to constant current and vice versa take place at the intersections of the constant voltage and constant current lines depending on the settings of each. These changes from one mode to the other are substantially instantaneous, unambiguous and with substantially no hysteresis or back-lash.

Figure 2:
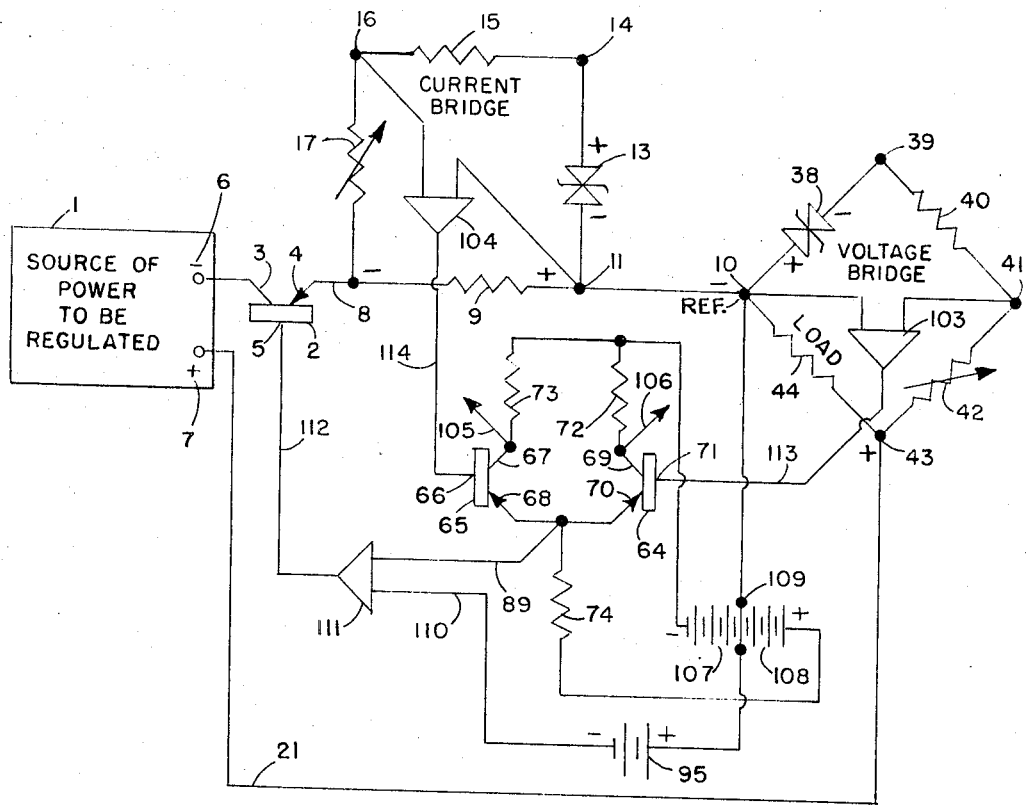
FIGURE 2 is a simplified schematic circuit diagram partly in block form representing one form of the present invention.

FIG. 2 is a simplified circuit diagram partly in block form illustrating one form of the present invention. Power to be regulated 1 having output terminals 6 (minus) and 7 (plus) supplies power to the voltage/current regulating system utilizing transistor 2 as a series pass control device. Collector 3 is connected to negative terminal 6 and emitter 4 is connected to terminal 8 of current sensing resistor 9. The current control bridge is formed across the four terminals 8, 11, 14 and 16 and includes current sensing resistor 9, reference voltage 13, which may consist in any suitable stable voltage reference such as Zener diode 13 suitably energized by conventional means not shown, reference resistor 15, and current control resistor 17 which may be a suitably adjustable or variable resistor as indicated. The output of the bridge is taken between terminals 11 and 16 and applied to error or control amplifier 104 the output of which appears on lead 114. When this bridge is balanced;

$$\frac{\text{reference voltage 13}}{\text{voltage across resistor 15}} = \frac{\text{voltage across resistor 9}}{\text{voltage across resistor 17}}$$

and no output appears across terminals 11 and 16. If the bridge is not in balance, an error voltage appears at the input to amplifier 104 and an amplified output voltage on lead 114 after further amplification in amplifier 111 is applied to lead 112 and base 5 of transistor 2 in a direction to cause the control action of transistor 2 to restore the bridge balance as will be more fully explained below. Since the voltage across resistor 9 is proportional to the output current of the regulating system, neglecting the bridge current which is equal to the voltage across resistor 15 divided by its resistance, the output current is controlled and is proportional to the resistance of resistor 17 in accordance with the above equation.

FIG. 2 also employs a bridge for voltage regulation connected across terminals 10, 39, 41 and 43. The voltage control bridge arms include a reference voltage 38, which may be a suitable stable voltage source such as Zener diode 38 suitably supplied with current by means not shown, connected between terminals 10 and 39, a reference resistor 40 connected between terminals 39 and 41, a voltage control resistor 42 suitably variable or adjustable connected between terminals 41 and 43 and the output load of the regulating system represented by resistor 44 connected between terminals 10 and 43. This bridge has an error or control amplifier 103 connected across terminals 10 and 41 the output of which passes over lead 113 and after further amplification in amplifier 111 is applied to control pass transistor 2 over lead 112 to base 5 in order to regulate the output voltage of the system by maintaining the voltage bridge balance. The voltage control bridge is balanced when;

$$\frac{\text{reference voltage 38}}{\text{voltage across resistor 40}} = \frac{\text{voltage across load 44}}{\text{voltage across resistor 42}}$$

Since amplifier 103 draws substantially no current, the currents flowing in resistors 40 and 42 are equal and the above equation may be written as:

$$\frac{\text{reference voltage 38}}{\text{resistance 40}} = \frac{\text{voltage across load 44}}{\text{resistance 42}}$$

Thus, the output voltage of the system, i.e., the voltage across load 44 is proportional to the resistance of resistor 42 and may be changed by changing its value. The positive end of load 44 is returned over lead 21 to terminal 7.

Thus far, the current control and voltage control bridges have been described together with the general method of utilizing their amplifier outputs to control the pass device and thereby to control and regulate the load current and voltage. The remaining functions to be described are the cross-over or change over from voltage regulation to current regulation and vice versa and the method of indicating which mode is in control. Since both current and voltage control are incompatible except for one unique point when the load resistance equals the regulated voltage divided by the regulated current, the cross-over in accordance with the present invention is substantially instantaneous at this unique point. A simple and effective method of providing this cross-over has been found to be a pair of transistors connected so that one or the other controls the output of the circuit but not both simultaneously and to which are applied the bridge error or control signals amplified sufficiently to cause the cross-over circuit to function cleanly and definitely at substantially the one unique point mentioned above. It has also been found that this pair of transistors furnishes a convenient and effective source of signal for actuating mode indicators such as a pair of lamps, one lighting during current mode operation and the other during voltage mode operation.

The cross-over circuit consists in transistors 64 and 65 connected to circuitry including resistors 74 common to both emitters 68 and 70 and returned to a positive bias source such as battery 108 having a neutral point 109 returned to output terminal 10 which may be considered the reference point of the system, and resistors 72 and 73 connected to collectors 69 and 67 respectively and returned to a negative bias source such as battery 107 also connected to neutral 109 and reference terminal 10. Base 66 is connected over lead 114 to the output of current bridge error amplifier 104 and base 71 is connected over lead 113 to the output of voltage bridge error amplifier 103. These two transistors as connected may be considered to provide an EXCLUSIVE OR circuit. The voltage at the emitter end of resistor 74 will always be substantially equal to the voltage on base 71 or on base 66 whichever is the more negative. Not only will the voltage be equal to the more negative base voltage, but this voltage will also act to bias off the transistor with the less negative base voltage. In effect the more negative base is always in control and the other transistor is cut-off. If neither bridge is supplying an output signal, as when they are both balanced at the unique point both transistor bases and emitters will be substantially at the same potential. However, the slightest departure from balance in either bridge will produce the following result. If the voltage bridge is controlling the output of the system, it will be producing an error signal which after amplification at base 71 and will be negative with respect to point 110. Emitter 70 following this voltage, places a control voltage on the input to amplifier 111 over lead 89 and an amplified control voltage over lead 112 on base 5 causing the series pass transistor to regulate the output voltage of the system. The current-sensing bridge will be out of balance, causing amplifier 104 to deliver a signal to base 66 which is positive with respect to point 110, thus biasing transistor 65 OFF. Transistor 64 is biased ON, drawing current thru collector resistor 72. Lead 106 will thus carry a signal which may be used to provide an indication to show that the system is operating in the voltage mode. In the same manner, if the current bridge is in control, i.e. is providing error signals amplified in amplifier 104 and applied to base 66, transistor 65 will conduct causing emitter 68 to follow it. This control voltage amplified in amplifier 111 controls pass transistor 2 and hence the output current of the system and also cuts-off transistor 64. Since collector 67 is thus made conducting, its voltage goes positive and this signal taken off on lead 105 may be used in an indicator to show current mode operation.

Figure 3:
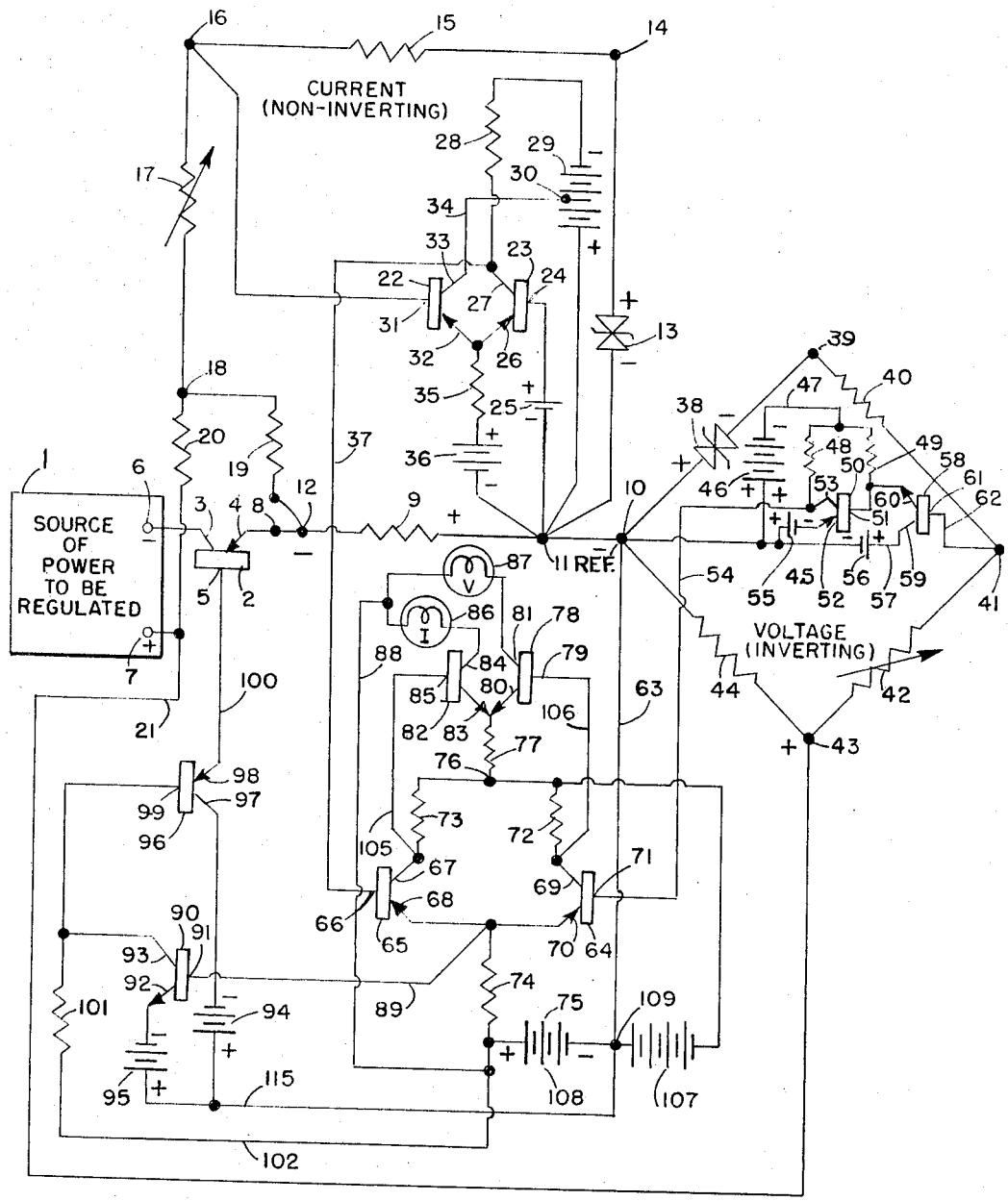
FIGURE 3 is similar to FIG. 2 but with added details.

FIG. 3 is a schematic circuit diagram like FIG. 2 except that some circuit details have been added. Similar parts are designated by the same numerals and it will be necessary at this point to merely describe the added details. The essential parts which have been added in FIG. 3 are details of amplifiers 103, 104 and 111 and details of one form of voltage/current indicator including lamps 86 and 87 together with suitable driving transistors 82 and 78 respectively.

The details of amplifier 104 of FIG. 2 which are shown in FIG. 3 include transistors 22 and 23 and their associated circuits. Transistor 22 includes base 31, emitter 32 and collector 33 and forms the first stage of the amplifier with input from bridge terminal 16 connected to base 31, collector 33 connected over lead 34 to a suitable negative bias point 30 on a suitable bias source in the form of battery 29 which is returned to the reference line at point 11. Emitter 32 is returned through a resistor 35 common to emitter 26 to a positive reference supplied by a suitable source such as battery 36 also returned to the reference line at point 11. Base 24 is returned to a slightly positive bias point supplied by a suitable source such as battery 25 also returned to the reference line at point 11. Collector 27 is connected to load resistor 28 which in turn is connected to a suitable source of negative bias such as battery 29. Collector 27 is connected over line 37 to base 66 of cross-over transistor 65. Thus, the current bridge error or unbalance signals are applied to base 31 causing signal currents from emitter 32 and flowing in the emitter coupling resistor 35 to actuate emitter 26 which in turn produces collector current representing these error signals in amplified form and a drop across resistor 28 which is applied to base 66. It will be seen that the polarity of the signals is not reversed in the amplified signals at base 66 with respect to the bridge signals at base 31.

Amplifier 111 is detailed in one of its possible forms in FIG. 3 and includes transistors 90 and 96. The first stage or input transistor 90 includes base 91, emitter 92 and collector 93. The input from across common emitter resistor 74 is applied over line 89 to base 91. Emitter 92 is connected to a suitable source of negative bias such as battery 95 which is returned over line 115 to the reference line at point 10. Collector 93 is connected to a load resistor 101 which is returned to the positive end of bias source 75. The second stage transistor 96 includes base 99 conductively connected to collector 93 to receive amplified signals developed across load resistor 101. Collector 97 is connected to the negative side of a suitable bias source such as battery 94 the positive side of which is returned to the reference line over line 115. Emitter 98 is conductively connected over line 100 to base 5 of the series pass transistor 2 thereby forming a common collector drive stage for the pass transistor. It will be seen that the polarities are such that an increase in current sensing resistor 9 will result in a less negative bias being placed on base 5 so that less current will be passed by transistor 2 thereby tending to reduce current in resistor 9.

Amplifier 103 (of FIG. 2) as detailed in FIG. 3 includes transistors 58 and 50. Transistor 58 forms the input transistor of the amplifier and is connected in a common collector circuit in which base 62 is conductively connected to voltage bridge point 41 and collector 59 is connected through a small bias source such as battery 56 over lead 57 and thus to diagonal bridge point 10 which is also taken as the reference potential point of the system. The second transistor 50 is connected with its base 51 conductively connected to emitter 60, its emitter 52 connected to a suitable source of negative off-set bias 55 returned to common point 10, and collector 53 connected over lead 54 to base 71 of one of the cross-over transistors 64. Emitter 60 is returned to a suitable source of negative bias such as battery 46 through emitter load resistor 49 and collector 53 is returned to the negative bias supplied by battery 46 over load resistor 48. This error or control amplifier will be seen to supply amplified output signals over lead 54 which are out of phase with the input signals at base 61 or at point 41 of the voltage control bridge.

The amplified voltage bridge signals, as has been pointed out above are applied to base 71 of transistor 64. Emitter coupled signals differentially supplied with transistor 64 are amplified by transistors 90 and 96 and thus serve to control the series pass transistor 2 as set forth above. As has been stated above, whether the current bridge or the voltage bridge is controlling pass transistor 2 and hence the output current or voltage depends on which of transistors 64 and 65 is receiving the more negative base input signal.

FIG. 3 also shows circuit details of one form of voltage/current mode indicator in the form of indicator lamps 86 and 87. These lamps are transistor D.C. coupled for sensitive indication. Lamp 87 is the voltage indicator which shows that the power supply is in voltage mode, i.e. is under control of the voltage control bridge. The voltage control indicator lead 106 is connected to base 79 of lamp drive transistor 78. Collector 81 is connected to lamp 87 which is returned over lead 88 to the positive end of bias source 108. Similarly lamp 86 indicates current mode operation, i.e. that the power supply is under control of the current bridge. The current control indicator lead 105 is connected to base 85 of lamp drive transistor 82. Collector 84 is connected to lamp 86 which is returned over lead 88 to the positive end of bias source 108.

The emitters 80 and 83 are connected to the common resistor 77 which is returned to point 76 and the negative end of bias source 107. This added EXCLUSIVE OR circuit of the two lamp drive transistors further enhances the sharp transition of indication from voltage to current or vice versa at the cross-over point.

FIG. 4 shows a schematic circuit diagram of a form of the invention which is basically the same as the form shown in FIGS. 2 and 3 but with some details added to complete the circuit of an actual commercial device. Since the main functions and essential components correspond with those of FIGS. 2 and 3 the same numbers are used to designate corresponding parts and reference is made to the description of FIGS. 2 and 3 for the general operation of the device. In the place of the various bias batteries, actual commercial circuits are shown utilizing rectified alternating current, filters and Zener diode regulation of voltage. Resistive voltage dividers are generally shown to provide relatively small voltages from larger voltage sources. One particularly useful device is transistor 116 which operating as an emitter follower tightly clamps the voltage on line 120 at substantially the voltage placed on its base at point 117 which is determined by the ratio of resistors 118 and 119 branched from negative line 121 to positive line 122. The source of power to be regulated 1 of FIGS. 2 and 3 is provided by two power transformers with suitable rectifiers and filters generally designated as 123 and 124. While bridge arms 15 and 40 are generally regarded as fixed resistors and the stability of the bridges depends on a high order of constancy with temperature and time in these resistors, it is useful to provide small trimming resistors 15' and 40' respectively for setting maximum current and voltage values respectively.

Reference is again made to FIG. 3 where resistors 19 and 20 provides one possible means for compensating the current bridge for the current in the voltage bridge as well as for any other current carrying shunts which may be placed across the load as, for instance, a voltmeter. Since resistor 19 is in series with current control resistor 17, and current is passed through it by way of resistor 20, the result will be for the current bridge to supply an additional current over and above that called for by resistor 17. Resistors 19 and 20 may be proportioned in such a manner as to call for the required compensating current to supply the voltage bridge current and any other shunting path other than the load, such as a shunting voltmeter. By thus compensating the current control circuit, the regulation of the current control function is not degraded by non-load shunt devices. This compensation is especially important at low current values being regulated in the load circuit.

While only one basic form of the present invention with a few variations has been shown and described, many modifications will be apparent to those skilled in the art and within the spirit and scope of the invention as set forth, in particular, in the appended claims.

What is claimed is:

1. In a voltage/current regulated power supply, the combination of, a source of power to be regulated, output means for the power supply, voltage/current regulating means connected between said source of power and said output means, means for generating a first signal in accordance with the output current of the power supply, means for generating a second signal in accordance with the output voltage of the power supply, a first pair of transistors each including at least a base, an emitter and a collector, means for applying said first signal to one of said bases, means for applying said second signal to the other of said bases, a resistor common to both of said emitters, a second pair of transistors each including at least a base, an emitter and a collector, means for coupling each of the bases of said second pair to one of said collectors of said first pair, a resistor common to said emitters of said second pair, and a first indicator lamp coupled to one of said collectors of said second pair and a second indicator lamp coupled to the other of said collectors of said second pair.

2. In a voltage/current regulated power supply, the combination of, a source of power to be regulated, a pair of output load terminals, signal responsive current control means and current proportional voltage developing current sensing means connected between said source of power and said terminals, first variable voltage reference means, means for comparing the voltage developed across said current sensing means with said first variable reference to provide current control error signal, second variable voltage reference means, means for comparing at least a portion of the output voltage across said terminals with said second variable voltage to provide a voltage control error signal, two amplifying means for amplifying said error signals, an OR gate device, means for applying said amplified error signals to said OR gate, and means for coupling said OR gate to said current control means for controlling the output across said load terminals in accordance with the predominating amplified error signal applied to said OR gate.

3. A voltage/current regulated power supply as set forth in claim 2 and including a two condition indicator coupled to said OR device for indicating whether the supply is operating in voltage or current mode.

4. A voltage/current regulated power supply as set forth in claim 2 and including two indicator lamps one of which is coupled to said OR device to indicate voltage mode operation and the other is coupled to said OR device to indicate current mode operation.

References Cited by the Examiner

UNITED STATES PATENTS

| 2,019,352 | 10/1935 | Livingston | 323—89 X |
| 2,714,188 | 7/1955 | Scherer | 323—66 |
| 2,912,635 | 11/1959 | Moore | 322—25 |
| 2,913,657 | 11/1959 | Erickson | 323—43.5 |
| 2,962,651 | 11/1960 | McNamee | 323—22 |
| 2,981,884 | 4/1961 | Tighe | 323—22 |

JOHN F. COUCH, *Primary Examiner.*

W. E. RAY, *Assistant Examiner.*